US009290855B2

(12) United States Patent
Worsley et al.

(10) Patent No.: US 9,290,855 B2
(45) Date of Patent: Mar. 22, 2016

(54) STABILIZATION OF GREEN BODIES VIA SACRIFICIAL GELLING AGENT DURING ELECTROPHORETIC DEPOSITION

(75) Inventors: Marcus A. Worsley, Hayward, CA (US); Joshua D. Kuntz, Livermore, CA (US); Klint A. Rose, Alviso, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 238 days.

(21) Appl. No.: 13/453,933

(22) Filed: Apr. 23, 2012

(65) Prior Publication Data

US 2012/0269218 A1 Oct. 25, 2012

Related U.S. Application Data

(60) Provisional application No. 61/478,410, filed on Apr. 22, 2011.

(51) Int. Cl.
*B32B 7/02* (2006.01)
*D02G 3/00* (2006.01)
*C04B 35/51* (2006.01)
(Continued)

(52) U.S. Cl.
CPC *C25D 13/02* (2013.01); *C25D 5/10* (2013.01); *H01S 3/0612* (2013.01); *H01S 3/1685* (2013.01); *Y10T 428/12021* (2015.01); *Y10T 428/12458* (2015.01); *Y10T 428/24926* (2015.01)

(58) Field of Classification Search
CPC .. C25D 13/02; C25D 5/10; Y10T 428/12021; Y10T 428/12458; Y10T 428/24926; H01S 3/0612; H01S 3/1685

USPC ............ 428/372, 212; 327/581; 427/218, 500
See application file for complete search history.

(56) References Cited

U.S. PATENT DOCUMENTS 3,804,034 A 4/1974 Stiglich, Jr.
4,464,206 A 8/1984 Kumar et al.
(Continued)

FOREIGN PATENT DOCUMENTS

DE 102008027418 A1 12/2009
EP 1 009 802 A2 6/2000
(Continued)

OTHER PUBLICATIONS

"Thick Plate-Shaped Al2O3/ZrO2 Composites with Continuous Gradient Processed by Electrophoretic Deposition", Mat. Sci. Forum vols. 423-425, 2003, p. 171-176.*
(Continued)

*Primary Examiner* — Maria Veronica Ewald
*Assistant Examiner* — Travis Figg
(74) *Attorney, Agent, or Firm* — Zilka-Kotab, PC

(57) ABSTRACT

In one embodiment, a method for electrophoretic deposition of a three-dimensionally patterned green body includes suspending a first material in a gelling agent above a patterned electrode of an electrophoretic deposition (EPD) chamber, and gelling the suspension while applying a first electric field to the suspension to cause desired patterning of the first material in a resulting gelation. In another embodiment, a ceramic, metal, or cermet includes a plurality of layers, wherein each layer includes a gradient in composition, microstructure, and/or density in an x-y plane oriented parallel to a plane of deposition of the plurality of layers along a predetermined distance in a z-direction perpendicular to the plane of deposition.

10 Claims, 10 Drawing Sheets

(51) Int. Cl.
  *C25D 13/02* (2006.01)
  *C25D 5/10* (2006.01)
  *H01S 3/16* (2006.01)
  *H01S 3/06* (2006.01)

(56) References Cited

U.S. PATENT DOCUMENTS

| | | | |
|---|---|---|---|
| 5,476,878 A | 12/1995 | Pekala | |
| 6,001,251 A | 12/1999 | Asher et al. | |
| 6,114,048 A * | 9/2000 | Jech et al. | 428/547 |
| 6,355,420 B1 | 3/2002 | Chan | |
| 7,048,963 B2 | 5/2006 | Braithwaite et al. | |
| 7,368,044 B2 | 5/2008 | Cohen et al. | |
| 7,471,362 B1 | 12/2008 | Jones | |
| 7,776,682 B1 | 8/2010 | Nickel et al. | |
| 8,685,287 B2 | 4/2014 | Worsley et al. | |
| 8,703,523 B1 | 4/2014 | Biener et al. | |
| 8,809,230 B2 | 8/2014 | Worsley et al. | |
| 8,968,865 B2 | 3/2015 | Worsley et al. | |
| 2002/0119455 A1 | 8/2002 | Chan | |
| 2003/0141618 A1 | 7/2003 | Braithwaite et al. | |
| 2004/0216486 A1 | 11/2004 | Schwertfeger et al. | |
| 2004/0217010 A1 | 11/2004 | Hu et al. | |
| 2005/0019488 A1 | 1/2005 | Braithwaite et al. | |
| 2005/0208121 A1 | 9/2005 | Barton et al. | |
| 2005/0255304 A1 | 11/2005 | Brink | |
| 2005/0285291 A1 | 12/2005 | Ku et al. | |
| 2006/0159722 A1 | 7/2006 | Braithwaite et al. | |
| 2006/0228401 A1 | 10/2006 | Braithwaite et al. | |
| 2006/0249388 A1 | 11/2006 | Chang et al. | |
| 2006/0289310 A1 | 12/2006 | Matson et al. | |
| 2007/0282439 A1 | 12/2007 | Zehbe et al. | |
| 2008/0006574 A1 | 1/2008 | Ramaswamy et al. | |
| 2009/0002617 A1 | 1/2009 | Jones | |
| 2009/0020924 A1 | 1/2009 | Lin | |
| 2009/0036557 A1 | 2/2009 | Ratke et al. | |
| 2009/0189315 A1 | 7/2009 | Gunster et al. | |
| 2009/0228115 A1 | 9/2009 | Liu et al. | |
| 2009/0288952 A1 | 11/2009 | Olevsky et al. | |
| 2010/0074787 A2 | 3/2010 | Neirinck et al. | |
| 2010/0105539 A1* | 4/2010 | Hollingsworth | B32B 18/00 501/152 |
| 2010/0230629 A1 | 9/2010 | Yu et al. | |
| 2011/0014258 A1* | 1/2011 | Gan et al. | 424/409 |
| 2011/0024698 A1 | 2/2011 | Worsley et al. | |
| 2011/0104491 A1* | 5/2011 | Shaw et al. | 428/372 |
| 2011/0250467 A1 | 10/2011 | Rose et al. | |
| 2012/0052511 A1 | 3/2012 | Worsley et al. | |
| 2012/0133428 A1 | 5/2012 | Forbes et al. | |
| 2012/0308622 A1* | 12/2012 | Clarkson et al. | 424/401 |
| 2013/0004761 A1 | 1/2013 | Worsley et al. | |
| 2013/0078476 A1 | 3/2013 | Riman et al. | |

FOREIGN PATENT DOCUMENTS

| | | |
|---|---|---|
| EP | 1 234 207 A1 | 8/2002 |
| EP | 2 103 719 A1 | 9/2009 |
| WO | WO 9409048 A1 * | 4/1994 ............ C08G 18/32 |
| WO | 98/35012 A2 | 8/1998 |
| WO | 9918892 A1 | 4/1999 |
| WO | 01/40853 A1 | 6/2001 |
| WO | 2004/050134 A2 | 6/2004 |
| WO | 2008/021191 A2 | 2/2008 |
| WO | WO 2011053598 A1 * | 5/2011 |

OTHER PUBLICATIONS

"Electrophoretic Deposition as Novel Near Net Shaping Technique for Functionally Graded Biomaterials", Mat. Sci. Forum vols. 492-493, 2005, p. 213-218.*

Vleugels et al. ("Thick Plate-Shaped Al2O3/ZrO2 Composites with Continuous Gradient Processed by Electrophoretic Deposition", Mat. Sci. Forum vols. 423-425, 2003, p. 171-176).*

Anne et al. ("Electrophoretic Deposition as Novel Near Net Shaping Technique for Functionally Graded Biomaterials", Mat. Sci. Forum vols. 492-493, 2005, p. 213-218).*

Sun et al. ("Graded/Gradient Porous Biomaterials" Materials 2010, 3, 26-57).*

Santillan, M. J. et al., "Electrophoretic Codeposition of La0.6Sr0.4Co0.8Fe0.2O3-delta and Carbon Nanotubes for Developing Composite Cathodes for Intermediate Temperature Solid Oxide Fuel Cells," 2009 The American Ceramic Society, International Journal of Applied Ceramic Technology vol. 7, No. 1, 2010, pp. 30-40.

Ferrari, B. et al., "Thermogelation of Al2O3/Y-TZP films produced by electrophoretic co-deposition," 2003 Elsevier Ltd., Journal of the European Ceramic Society vol. 24, No. 10-11, 2004, pp. 3073-3080.

Butsko et al., "The Formation of Polysilicic Acid Gels In An Electric Field: The Properties of Acidic Xerogels," 1973 Consultants Bureau, a division of Plenum Publishing Corporation, Uzhgorod University, Translated from Kolloidnyi Zhurnal, vol. 35, No. 2, pp. 339-344, Mar.-Apr. 1973, pp. 303-307.

Final Office Action from U.S. Appl. No. 13/085,405 dated Apr. 8, 2014.

Perry et al., "Phase Characterization of Partially Stabilized Zirconia by Raman Spectroscopy," Journal of American Ceramics Society, vol. 68, No. 8, Aug. 1985, pp. C-184/C-187.

Anne et al., "Electrophorectic Deposition as a Novel Near Net Shaping Technique for Functionality Graded Biomaterials," Materials Science Forum, vols. 492-493, 2005, pp. 213-218.

Shirai et al., "Structural Properties and Surface Characteristics on Aluminum Oxide Powders," Ceramics Research Laboratory, vol. 9, 2009, pp. 23-31.

Restriction/Election Requirement from U.S. Appl. No. 13/085,405 dated May 10, 2013.

Non-Final Office Action from U.S. Appl. No. 13/085,405 dated Sep. 12, 2013.

Machine translation of DE 102008027418, retrieved from espacenet.com.

Non-Final Office Action from U.S. Appl. No. 13/180,440, dated Dec. 5, 2014.

Worsley et al., U.S. Appl. No. 13/180,440, filed Jul. 11, 2011.

Restriction Requirement from U.S. Appl. No. 13/180,440, dated Jun. 19, 2014.

Jin, J.I., "Advanced Polymers for Emerging Technologies." The News Magazine of the International Union of Pure and Applied Chemistry (IUPAC), vol. 29, No. 3, 2007, pp. 1-2.

Akerman, B., "Barriers Against DNA-Loop Formation in a Porous Matrix," Physical Review, E., Statistical Physics, Plasmas, Fluids, and Related Interdisciplinary Topics, No. 6, vol. 54, 1996, pp. 6685-6696, abstract only.

Angelescu et al., "Enhanced Order of Block Copolymer Cylinders in Single-Layer Films Using a Sweeping Solidification Front," Advanced Materials, vol. 19, Issue 18, 2007, pp. 2687-2690, abstract only.

Anklam et al., "Electric-Field-Induced Rupture of Polymer-Stabilized Oil Films," Colloid Polym. Sci. No. 277, 1999, pp. 957-964.

Banda et al., "Electric Field-Assisted Processing of Anisotropic Polymer Nanocomposites," ASME 2007 International Mechanical Engineering Congress and Exposition (IMECE2007), vol. 13, Nov. 11-15, 2007, abstract only.

Bobrovsky et al., "New photosensitive polymer composites based on oriented porous polyethylene filled with azobenzene-containing LC mixture: reversible photomodulation of dichroism and birefringence," Liquid Crystals, vol. 35, No. 5, 2008, pp. 533-539, abstract only.

Bouchet et al., "Contactless Electrofunctionalization of a Single Pore," Small, vol. 5, No. 20, 2009, pp. 2297-2303.

Buscaglia et al., "Memory effects in nematics with quenched disorder," The American Physical Society, Phys. Rev. E., vol. 74, No. 1, 2006, pp. 1-8, abstract only.

Chao et al., "Orientational Switching of Mesogens and Microdomains in Hydrogen-Bonded Side-Chain Liquid-Crystalline Block Copolymers Using AC Electric Fields," Advanced Functional Materials, vol. 14, No. 4, 2004, pp. 364-370, abstract only.

Cho et al., "Anisotropic alignment of non-modified BN nanosheets in polysiloxane matrix under nano pulse width electricity," Journal of the Ceramic Society of Japan, vol. 118, No. 1, 2010, pp. 66-69.

(56) References Cited

OTHER PUBLICATIONS

Crossland et al.. "Control of gyroid forming block copolymer templates: effects of an electric field and surface topography." Soft Matter, Issue 3, 2010, pp. 1-7, abstract only.

De Rosa et al., "Microdomain patterns from directional eutectic solidification and epitaxy," Nature, vol. 405, 2005, pp. 433-437, abstract only.

Findlay, R. B., "Microstructure of Side Chain Liquid Crystalline Polymers and their Alignment Using Electric Fields and Surfaces," Molecular Crystals and Liquid Crystals, vol. 231, No. 1, pp. 137-151.

Hasegawa et al., "Micro-Flow Control and Micropump by Applying Electric Fields through a Porous Membrane," JSME International Journal Series B, vol. 47, No. 3, 2004, pp. 557-563.

Hatch et al., "Integrated Preconcentration SDS-PAGE of Proteins in Microchips Using Photopatterned Cross-Linked Polyacrylamide Gels," Analytical Chemistry, vol. 78, No. 14, 2006, pp. 4976-4984.

Holstein et al., "Reorienation of a Liquid Crystalline Side-chain Polymer in Electric and Magnetic Fields Investigated by Solid-State 1H-NMR," Polymers for Advanced Technologies, Polym. Adv. Technol. vol. 9, 1998, pp. 659-664.

Horike et al., "Soft Porous Crystals," Nat. Chem., vol. 1, No. 9, 2009, pp. 695-704, abstract only.

Huang et al., "Electromechanical Response in Liquid Crystal Gels and Networks," Smart Structures and Materials 2003: Electroactive Polymer Actuators and Devices (EAPAD), SPIE vol. 5051, 2003, pp. 496-503.

Jun et al., "Synthesis and Characterizations of Monodispersed Micron-Sized Polyaniline Composite Particles for Electrorheological Fluid Materials," Colloid Polym Sci. vol. 280, 2002, pp. 744-750.

Kacprzyk, R., "Polarization of Porous PE Foil," 11th International Symposium of Electrets, 2002, pp. 207-210.

Kontopoulou et al., "Electrorheological Properties of PDMS/Carbon Black Suspensions Under Shear Flow," Rheologica Acta, vol. 48, No. 4, 2009, pp. 409-421, abstract only.

Kurabayashi. K., "Anisotropic Thermal Energy Transport in Polarized Liquid Crystalline (LC) Polymers Under Electric Fields," Microscale Thermophysical Engineering, vol. 7, No. 2, 2003, pp. 87-99, abstract only.

Legge et al., "Memory Effects in Liquid Crystal Elastomers," Journal of Physics II, France, vol. 1, 1991, pp. 1253-1261.

Liu et al., "Controlled Deposition of Crystalline Organic Semiconductors for Field-Effect-Transistor Applications," Advanced Materials, vol. 21, 2009, pp. 1217-1232.

Martin, DC., "Controlled Local Organization of Lyotropic Liquid Crystalline Polymer Thin Films with Electric Fields," Polymer, vol. 43, No. 16, 2002, pp. 4421-4436, abstract only.

Martins et al., "Theory and Numerical Simulation of Field-Induced Director Dynamics in Confined Nematics Investigated by nuclear magnetic resonance," Liquid Crystals, vol. 37, No. 6-7, 2010 pp. 747-771.

Matsen, M. W., "Electric Field Alignment in Thin Films of Cylinder-Forming Diblock Copolymer," Macromolecules, vol. 39, 2006, pp. 5512-5520.

Motyl et al., "Piezoelectric Properties of PZT-HFPP Composites," Scientific Papers of the Institute of Electrical Engineering Fundamentals of the Wroclaw University of Technology, No. 40, Conference 15, 2004, pp. 312-314.

Neves et al., "Experimental Results on Electrorheology of Liquid Crystalline Polymer Solutions," American Institute of Physics Conference Proceedings, No. 1027, 2008, pp. 1429-1431.

O'Grady et al., "Optimization of Electroactive Hydrogel Actuators," Applied Materials & Interfaces, vol. 2, No. 2, 2010, pp. 343-346.

Olszowka et al., "3-Dimensional Control Over Lamella Orientation and Order in Thick Block Copolymer Films," Soft Matter, Issue 4, 2009, pp. 812-819, abstract only.

Ridler et al., "Electrofluorescence of Dye-Tagged Polynucleotides," Polymer, vol. 37, No. 22, 1996, pp. 4953-4960.

Rohman et al., "Design of Porous Polymeric Materials from Interpenetrating Polymer Networks (IPNs): Poly(DL-lactide)/poly(methyl methacrylate)-based semi-IPN systems," Macromolecules, vol. 38, No. 17, 2005, pp. 7274-7285.

Rohman et al., "Poly(d,l-lactide)/poly(methyl methacrylate) interpenetrating polymer networks: Synthesis, Characterization, and Use As Precursors to Porous polymeric materials," Polymer, vol. 48, No. 24, 2007, pp. 7017-7028, abstract only.

Rozanski, S. A., "Electrooptical Properties of a Nematic Liquid Crystal Adsorbed in Cellulose Membrane," Synthetic Metals, vol. 109, 2000, pp. 245-248.

Shimura et al., "Electric-Field-Responsive Lithium-Ion Conductors of Propylenecarbonate-Based Columnar Liquid Crystals," Advanced Materials, vol. 21, 2009, pp. 1591-1594.

Song et al., "Overlap Integral Factor Enhancement Using Buried Electrode Structure in Polymer Mach-Zehnder Modulator," Applied Physics Letter, vol. 92, Issue 3, 2008, pp. 103, abstract only.

Tehrani et al., "Effect of Low Field Magnetic Annealing on the Viscoelastic Behavior of a Structural Epoxy," Proceedings of the ASME 2009 International Mechanical Engineering Congress & Exposition, pp. 1-8.

Tsori et al., "Block Copolymers in Electric Fields: A Comparison of Single-Mode and Self-Consistent-Field Approximations," Macromolecules, vol. 39, 2006, pp. 289-293.

Tsori et al., "Orientational Transitions in Symmetric Diblock Copolymers on Rough Surfaces," Macromolecules, vol. 38, Apr. 2005, pp. 105, abstract only.

Valentini et al., "Anisotropic Electrical Transport Properties of Aligned Carbon Nanotube/PMMA Films Obtained by Electric-Field-Assisted Thermal Annealing," Macromolecular Materials and Engineering, vol. 293, 2008, pp. 867-871.

Wakefield et al., "Three-Dimensional Alignment of Liquid Crystals in Nanostructured Porous Thin Films," Proceedings of SPIE, vol. 6654, 2007, pp. 1-15.

Wegener et al., "Porous Polytetraftuoroethylene (PTFE) Electret Films: porosity and time dependent charging behavior of the free surface," Journal of Porous Material, vol. 14, 2007, pp. 111-118.

Zorn et al.. "Orientation and Dynamics of ZnO Nanorod Liquid Crystals in Electric Fields." Macromolecular Rapid Communications, vol. 31, 2010, pp. 1101-1107.

Hassanin et al., "Functionally graded microceramic components," Microelectronic Engineering, vol. 87, 2009, pp. 1610-1613.

Hassanin et al., "Infiltration-Processed, Functionally Graded Materials for Microceramic Components," 2010 IEEE, pp. 368-371.

Moritz et al., "Zr02 ceramics with aligned pore structure by EPD and their characterisation by X-ray computed tomography," Science Direct, Journal of the European Ceramic Society, vol. 30, 2010, pp. 1203-1209.

Olevsky et al., "Fabrication of Tailored Powder Structures by Electrophoretic Deposition and Sintering," Switzerland, Key Engineering Materials, vol. 434-435, 2010, pp. 757-760.

Zaman et al., "3-D micro-ceramic components from hydrothermally processed carbon nanotube-boehmite powders by electrophoretic deposition," Science Direct, Ceramics International, vol. 36, 2010, pp. 1703-1710.

Clasen et al., "Near net shaping with bimodal powders on shaped membranes via EPD," Switzerland, Key Engineering Materials, vol. 412, 2009, pp. 45-50.

Dziomkina et al., "Layer-by-layer templated growth of colloidal crystals with packing and pattern control," Science Direct, Colloids and Surfaces A: Physicochemical and Engineering Aspects, vol. 342, 2009, pp. 8-15.

Moritz et al., "Electrophoretically deposited porous ceramics and their characterisation by X-ray computer tomography," Switzerland, Key Engineering Materials, vol. 412, 2009, pp. 255-260.

Novak et al., "Infiltration of a 3-D Fabric for the Production of SiC/SiC Composites by Means of Electrophoretic Deposition," Switzerland, Key Engineering Materials, vol. 412, 2009, pp. 237-242.

Xu et al., "Fast and Controlled Integration of Carbon Nanotubes into Microstructures," Materials Research Society, Mater. Res. Soc. Symp. Proc., vol. 1139, 2009, pp. 59-64.

Ryan et al., "Vertical Aligned Nanorod Assembly by Electrophoretic Deposition from Organic Solvents," Materials Research Society, Mater. Res. Soc. Symp. Proc, vol. 1121, 2009, pp. 36-40.

(56) References Cited

OTHER PUBLICATIONS

Moon et al., "Triply Periodic Bicontinuous Structures as Templates for Photonic Crystals: A Pinch-off Problem," Wiley-VCH Verlag GmbH & Co., Adv. Mater. 2007, vol. 19, 2007, pp. 1510-1514.
Tabellion et al., "Shaping of Bulk Glasses and Ceramics with Nanosized Particles," Synthesis and Processing of Nanostructured Materials, Nov. 2006, pp. 129-136.
Van Der Biest et al., "Laminated and functionally graded ceramics by electrophoretic deposition," Trans Tech Publications, Switzerland, Key Engineering Materials, vol. 333, 2007, pp. 49-58.
Anne et al., "Engineering The Composition Profile In Functionally Graded Materials Processed By Electrophoretic Deposition," Innovative Processing And Synthesis Of Ceramics, Glasses and Composites IX, vol. 177, 2006, pp. 45-52.
Hamagami et al., "3D Particle Assembly in Micro-Scale by Using Electrophoretic Micro-Fabrication Technique," Key Engineering Materials Switzerland, Vol.314, 2006, pp. 7-12.
Li et al., "The control of crystal orientation in ceramics by imposition of a high magnetic field," Materials Science and Engineering A, vol. 44, 2006, pp. 227-231.
Oetzel et al., "Preparation of zirconia dental crowns via electrophoretic deposition," J. Mater Sci, 2006, vol. 41, pp. 8130-8137.
Braun et al., "Transparent Alumina Ceramics With Sub-Microstructure By Means Of Electrophoretic Deposition," Developments in Advanced Ceramics and Composites, vol. 26, 2005, pp. 97-104.
Takahashi et al., "Growth and Electrochemical Properties of Single-Crystalline V205 Nanorod Arrays," 2005 The Japan Society of Applied Physics, vol. 14, No. IB, 2005, pp. 662-668.
Nicolay et al., "Physical Charasterisation of Transparent PLZT Ceramics Prepared by Electrophoretic Deposition," Ceramic Engineering and Science Proceedings, vol. 25, pp. 129-134.
Bartscherer et al.. "Improved Preparation of Transparent PLZT Ceramics by Electrophoretic Deposition and Hot Isostatic Pressing," 27th International Cocoa Beach Conference on Advanced Ceramics and Composites, vol. 24, 2003, pp. 169-174.
Boccaccini et al., "The Use Of Electrophoretic Deposition For The Fabrication of Ceramic And Glass Matrix Composites," Advances in Ceramic Matrix Composites IX, vol. 153, 2004, pp. 57-66.
Chen et al., "Investigation on the Electrophoretic Deposition of a FGM piezoelectric monomorph acutator," Journal of Materials Science, vol. 38, 2003, pp. 2803-2807.
Ishikawa et al., "Formation Process of Three-Dimensional Arrays from Silica Spheres," Materials, Interfaces, and Electrochemical Phenomena, AIChE Journal, vol. 49, No. 5, 2003, pp. 1293-1299.
Tian et al., "Complex and oriented ZnO nanostructures," Natural Materials, vol. 2, 2003, pp. 821-826.
Kaya, "A1203-Y-TZP/A1203 functionally graded composites of tubular shape from nano-sols using double-step electrophoretic deposition," Journal of the European Ceramic Society, vol. 23, 2002, pp. 1655-1660.
Braun et al., "Transparent Polycrystalline Alumina Ceramic with Sub-Micrometre Microstructure by Means of Electrophoretic Deposition," Materialwissenschaft and Werkstofftechnik, 2006, vol. 37, No. 4, pp. 293-297.
Put et al., "Gradient Profile Prediction In Functionally Graded Materials Processed by Electrophoretic Deposition," Acta Materialia, vol. 51, 2003, pp. 6303-6317.
Olevsky et al., "Fabrication of Net-Shape Functionally Graded Composites by Electrophoretic Deposition and Sintering: Modeling and Experimentation," J. Am. Ceram. Soc., vol. 90, No. 10, 2007, pp. 3047-3056.
Besra et al., "A review on fundamentals and applications of electrophoretic deposition (EPD)," Science Direct, Progress in Materials Science, vol. 52, 2007, pp. 1-61.
Tabellion et al., "Electrophoretic Deposition from Aqueous suspensions for near-shape manufacturing of advanced ceramics and glasses—applications," Journal of Materials Science, vol. 39, 2004, pp. 803-811.
Ryan et al., "Electric-Field-Assisted Assembly of Perpendicularly Oriented Nanorod Superlattices," Nano Letters, vol. 6, No. 7, 2006, pp. 1479-1482.
Ahmed et al.. "Centimetre Scale Assembly of Vertically aligned and close packed semiconductor nanorods form solution," Chem. Commun. Issue 42, 2009, pp. 6421-6423.
Rose et al., U.S. Appl. No. 13/085,405, filed Apr. 12, 2011.
Non-Final Office Action from U.S. Appl. No. 13/085,405, dated Feb. 27, 2015.
Non-Final Office Action from U.S. Appl. No. 13/085,405, dated Jul. 21, 2015.
Final Office Action from U.S. Appl. No. 13/180,440, dated Jul. 31, 2015.
Baumann et al., "High surface area carbon aerogel monoliths with hierarchical porosity," Journal of Non-Crystalline Solids, vol. 354, Issue 29, 2008, pp. 3513-3515.
Baumann et al., "Template-directed synthesis of periodic macroporous organic and carbon aerogels," Journal of Non-Crystalline Solids, vol. 350, Dec. 15, 2004, pp. 120-125.
Bock et al., "Structural Investigation of Resorcinol Formaldehyde and Carbon Aerogels Using SAXS and BET," Journal of Porous Materials, vol. 4, Issue 4, 1997, pp. 287-294.
Fukasawa et al., "Pore structure of porous ceramics synthesized from water-based slurry by freeze-dry process," Journal of Materials Science, vol. 36, Issue 10, 2001, pp. 2523-2527.
John Wiley & Sons, "Definitions," Hawley's Condensed Chemical Dictionary, http://onlinelibrary.wiley.com/mrw/advanced/search?doi=1 0.1 00219780470114735, Jan. 2007, pp. 1-3.
Ryoo et al., "Ordered Mesoporous Carbons," Adv. Mater., vol. 13, No. 9, May 3, 2001, pp. 677-681.
Wolff et al., "Preparation of polycrystalline ceramic compacts made of alumina powder with a bimodal particle size distribution for hot isostatic pressing," Ceramic Engineering and Science Proceedings, American Ceramic Society, vol. 24, 2003, pp. 81-86.

\* cited by examiner

STABILIZATION OF GREEN BODIES VIA SACRIFICIAL GELLING AGENT DURING ELECTROPHORETIC DEPOSITION

RELATED APPLICATIONS

This application claims priority to U.S. Provisional Patent Application No. 61/478,410 filed on Apr. 22, 2011, which is herein incorporated by reference.

The Applicant incorporates by reference provisional U.S. Patent Application No. 61/323,697 filed on Apr. 13, 2010, U.S. patent application Ser. No. 13/085,405 filed on Apr. 12, 2011, and U.S. patent application Ser. No. 13/180,440 filed on Jul. 11, 2011.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to functionality graded materials, and more particularly, to stabilizing green bodies using sacrificial gelling agent in the formation of functionality graded materials.

BACKGROUND

The electrophoretic deposition (EPD) process utilizes electric fields to deposit charged nanoparticles from a solution onto a substrate. Earlier industrial use of the EPD process employed organic solvent solutions and therefore typically generated hazardous waste as a by-product of the process. In addition, the shapes, compositions, densities, and microstructures of materials formed through EPD processes have typically been difficult if not impossible to control, either separately or in combination with one another. Also, it is extremely difficult to form structures from more than one material. That is to say, typical EPD processes are limited in that they are only capable of forming planar, homogenous structures.

Recent nanomaterial work has demonstrated that EPD can, at small length scales, be performed using aqueous (water-based) solutions. EPD has been used with a wide range of nanoparticles including, but not limited to, oxides, metals, polymers, semiconductors, and even diamond. Advanced EPD formation techniques may be able to achieve even more useful products, such as ceramics and cermets.

SUMMARY

In one embodiment, a method for electrophoretic deposition of a three-dimensionally patterned green body includes suspending a first material in a gelling agent above a patterned electrode of an electrophoretic deposition (EPD) chamber, and gelling the suspension while applying a first electric field to the suspension to cause desired patterning of the first material in a resulting gelation.

In another embodiment, a ceramic, metal, or cermet includes a plurality of layers, wherein each layer includes a gradient in composition, microstructure, and/or density in an x-y plane oriented parallel to a plane of deposition of the plurality of layers along a predetermined distance in a z-direction perpendicular to the plane of deposition.

In yet another embodiment, a method for forming a green body includes providing an aqueous or organic solution having a first material to be deposited and a gelling agent to an EPD chamber, applying a voltage difference across a first electrode and a second electrode of the EPD chamber, electrophoretically depositing the first material above the first electrode according to a first pattern to form a structure, and gelling the solution to form a gelation to support the structure.

Other aspects and advantages of the present invention will become apparent from the following detailed description, which, when taken in conjunction with the drawings, illustrate by way of example the principles of the invention.

Figure 1:
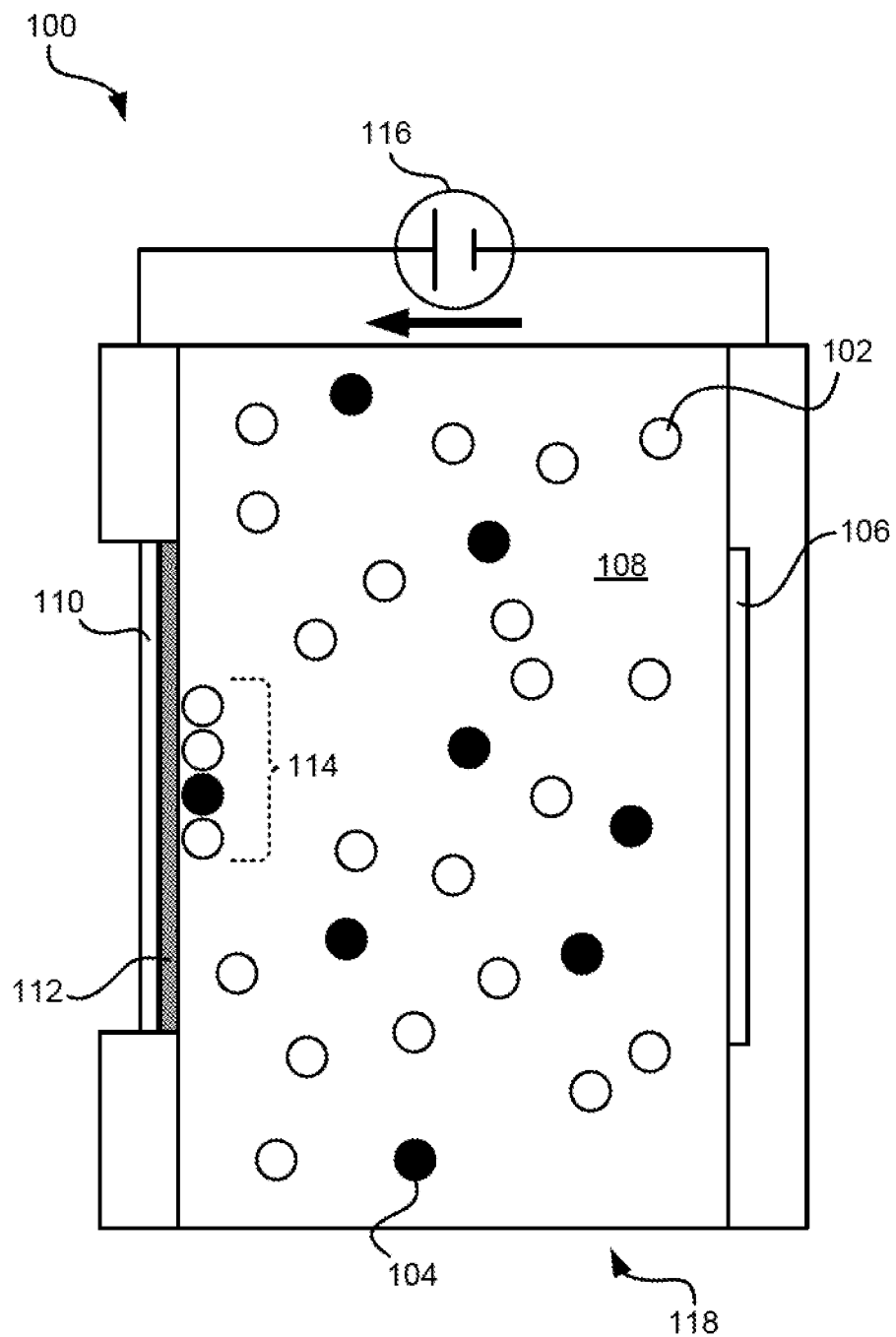
FIG. 1 is a simplified schematic diagram of an electrophoretic deposition (EPD) device, according to one embodiment.

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following description discloses several preferred embodiments of stabilizing green bodies using a sacrificial gelling agent and/or related systems and methods thereof.

In one general embodiment, a method for electrophoretic deposition of a three-dimensionally patterned green body includes suspending a first material in a gelling agent above a patterned electrode of an electrophoretic deposition (EPD) chamber, and gelling the suspension while applying a first electric field to the suspension to cause desired patterning of the first material in a resulting gelation.

In another general embodiment, a ceramic, metal, or cermet includes a plurality of layers, wherein each layer includes a gradient in composition, microstructure, and/or density in an x-y plane oriented parallel to a plane of deposition of the plurality of layers along a predetermined distance in a z-direction perpendicular to the plane of deposition.

In yet another general embodiment, a method for forming a green body includes providing an aqueous or organic solution having a first material to be deposited and a gelling agent to an EPD chamber, applying a voltage difference across a first electrode and a second electrode of the EPD chamber, electrophoretically depositing the first material above the first electrode according to a first pattern to form a structure, and gelling the solution to form a gelation to support the structure.

Currently used EPD technology may be expanded to three dimensions and may provide for the production of transparent ceramics from about 1% dense to about 30% dense green bodies using sintering alone. In addition, in some approaches, structures may be patterned in three dimensions by automating sample injection to tailor z-axis composition of the structure, modifying an electrode pattern in an x-y plane to precisely pattern concentration profiles, controlling particle orientation during deposition to define grain structures, and using non-planar electrode geometries to enable complex green body shapes.

Functionally graded materials (FGM) fabricated with gradients in composition, microstructure, and/or density produce enhanced bulk properties, which typically correspond to a combination of the precursor material properties. For example, tailoring the dopant profile in ceramic laser amplifiers may enable new designs for laser optics by exercising novel control of the beam profile. Current patterning via EPD is hinted to two dimensions or a single layer of particles. The techniques described herein according to various embodiments overcome this obstacle by using a sacrificial gelling agent, such as an organic sol-gel, to extend a two-dimensional pattern into a stable, three-dimensionally patterned green body. The gelling agent may then be completely removed during drying and sintering to produce a stable structure, for example, a transparent ceramic. These new techniques provide revolutionary new capabilities in the synthesis of complex materials and structures, as described herein in more detail.

The ability to deposit multiple layers of different particle diameters using the EPD technique with simple parallel plate geometries has been shown. Deposition of three-dimensional crystalline structures from polystyrene precursor particles is disclosed herein. In addition, the ability to produce nearly spherical ceramic precursor particles on the order of about 500 nm in diameter has also been achieved, along with the ability to create homogeneous ceramic green bodies that are transparent after sintering.

The EPD process has been used previously to synthesize cylindrical and other net-shape nun-scale parts. Using graphite as an electrode material, complex electrode geometries may be produced which provide a contour for a bulk part to be deposited on. Using finite element method (FEM) modeling as a guide, the electrode shapes and the resulting electric fields may be ensured to be conducive to rapid and dense deposition.

Furthermore, EPD may be used with shaped graphite or machined-metal electrodes with non-planar geometries to create green bodies with complex shapes. This may, in some embodiments, produce opaque ceramic armor prototypes with a radius of curvature of greater than about 2 inches produced from a single precursor material.

In another embodiment, EPD may be used with automated particle injection to control z-axis deposition and composition of a suspension solution. This may result, in some approaches, in opaque ceramic armor prototypes with a gradient in the properties in the z-direction from a hard strike face (such as boron carbide) to a ductile backing (such as aluminum).

To control the composition of the green body in the z-axis, the composition of the suspension in the deposition chamber may be adjusted using an automated injection system. This approach has been used to create density and composition-gradient coatings and materials. Using this technique, a sharp gradient may be created by abruptly changing the particle solution or a smooth gradient by gradually adjusting between two particle types. For the armor application, boron carbide particles may be deposited to create a hard surface then gradually transition to aluminum particles to create a ductile backing. This transition from hard to ductile material is predicted to be a very good composition for an efficient armor plate, but other compositions are possible using this technique from many different materials or combinations thereof.

In addition, according to various approaches, particle suspensions may be created with a controlled number and amount of contaminants, monodisperse particle size, and desired particle geometry (e.g., rod-like, spherical, etc.). Particle suspensions may be produced with the requisite properties confirmed through characterization of the particle zeta potential and size and solution properties, such as pH and conductivity, in order to achieve the desired green body.

As shown in FIG. 1, an EPD device 100 may include a first electrode 110 and a second electrode 106 positioned on either side of an EPD chamber 118, with a voltage difference 116 applied across the two electrodes 106, 110 that causes charged nanoparticles 102 and/or 104 in a solvent 108 to move toward the first electrode 110 as indicated by the arrow. In some embodiments, a substrate 112 may be placed on a solution side of the first electrode 110 such that nanoparticles 114 may collect thereon.

The EPD device 100, in some embodiments, may be used to deposit materials to the first electrode 110 or to a conductive or non-conductive substrate 112 positioned on a side of the electrode 110 exposed to a solution 108 including the material 102, 104 to be deposited. By controlling certain characteristics of formation of structures in an EPD process, such as the precursor material composition (e.g., homogenous or heterogeneous nanoparticle solutions) and orientation (e.g., non-spherical nanoparticles), deposition rates (e.g., by controlling an electric field strength, using different solvents, etc.), particle self-assembly (e.g., controlling electric field strength, particle size, particle concentration, temperature, etc.), material layers and thicknesses (e.g., through use of an automated sample injection system and deposition time), and deposition patterns with each layer via use of dynamic electrode patterning), intricate and complex structures may be formed using EPD processes that may include a plurality of densities, microstructures, and/or compositions, according to embodiments described herein.

Equation 1 sets out the basic system-level model for electrophoretic deposition, where $W_{film}$ is the mass of the deposition layer, $\mu$ is the electrophoretic mobility, E is the electric field, A is the area of the electrode substrate, C is the deposition particle mass concentration, and t is the deposition time.

$$W_{film} = \int_{t1}^{t2} \mu E \, A \, C \, dt \quad \text{Equation 1}$$

Combining these principles with dynamic patterning and sample delivery (which is described in more detail later), electrophoretic deposition may be employed to produce a diverse set of products with unique and/or difficult to obtain shapes, designs, and properties custom-fitted to any of a number of practical applications.

In one approach, EPD technology may be combined with pattern-oriented deposition in order to effectuate complex three-dimensional patterning structures. In another approach, coordinating sample injection during EPD further enables complex patterning of structures that may include concentration gradients of a deposited material in complex three-dimensional arrangements.

In another approach, multiple materials may be combined during patterning by way of coordinated sample injection in order to effectuate complex electrochemical and structural arrangements. By way of example, this approach may be employed to accomplish sample doping or to form ceramics or composites, such as ceramic metals (cermets).

Similarly, multiple dynamic patterns may be overlaid in combination with dynamic sample injection during the EPD process to generate a layered structure having differing arrangements, densities, microstructures, and/or composition according to any number of factors, including preferences, application requirements, cost of materials, etc.

Figure 2A:
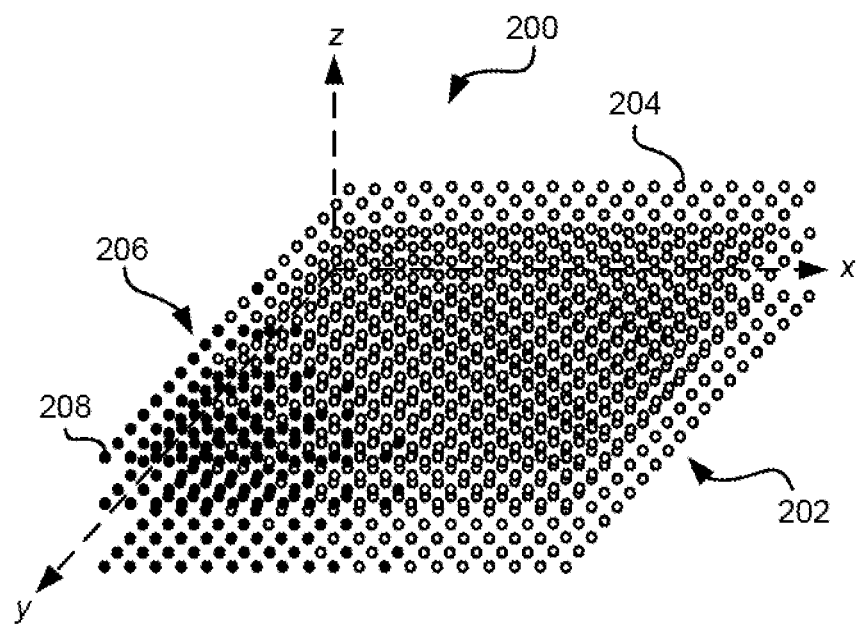
FIGS. 2A-2B show a simplified view of layers of a structure formed through an EPD process, according to one embodiment.
Figure 2B:
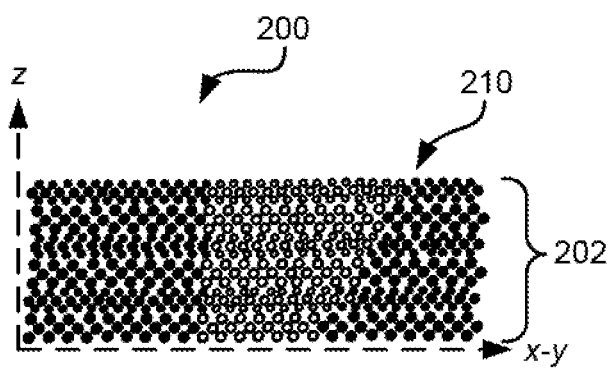

Now referring to FIGS. 2A-2B, according to one embodiment, a ceramic, metal, or cermet 200 comprises a plurality of layers 202 having a gradient 206 in composition, microstructure and/or density in an x-y plane oriented parallel to a plane of deposition of the plurality of layers 202. The gradient of the plurality of layers 202, according to various embodiments, may be smooth, abrupt, or comprised of small, incremental steps.

As shown in FIG. 2A, the x-y plane is represented in an isometric view of a simplified schematic diagram of a plurality of layers 202, which is represented by a plurality of white dots 204 and/or black dots 208. The dots 204 and/or 208 may represent a density of the layer (such as the black dots 208 representing a more dense volume, with the white dots 204 representing a less dense volume), a composition of the layer (such as the black dots 208 representing a first material, with the white dots 204 representing a second material), a microstructure of the layer (such as the black dots 208 representing a first lattice structure, with the white dots 204 representing a second lattice structure), etc. Of course, the embodiments described herein are not meant to be limiting on the invention in any way. Also, the patterns are not limited to those shown in FIGS. 2A and 2B, and may include any shape (polygonal, regular, irregular, etc.), repeating pattern (single pixels, lines, shapes, areas, etc.), random array (e.g., a predefined composition of materials with a random arrangement, such as a 25%/75% material A/material B split, a 50%/50% material A/material B split, etc.), etc.

According to one embodiment, the gradient 206 of the plurality of layers 202 may be defined by a first material 208 being arranged in a first pattern and a second material 204 being arranged in a second pattern, wherein the first pattern is complementary to the second pattern. The term "complementary" indicates that one pattern does not overlay the other pattern, but gaps may remain between the patterns where no material is deposited, in some approaches. In other approaches, the second pattern may be a reverse or negative pattern of the first pattern, e.g., red and black squares of a checkerboard. Of course, any pattern may be used for the first and second patterns as would be understood by one of skill in the art upon reading the present descriptions, including patterns that are not complementary. In more approaches, the patterns may be changed as material is deposited, causing even more options to material formation, layering, etc.

In another embodiment, at least the first material 208 and/or the plurality of layers 202 may have a characteristic of being deposited through an EPD process according to the first pattern. This characteristic may include, in some embodiments, smooth, gradual gradients between the materials in the plurality of layers 202, abrupt transitions from the first material 208 to the second material 204 in the plurality of layers 202, regular patterning between the first material 208 and the second material 204, or any other characteristic of deposition through an EPD process as would be understood by one of skill in the art upon reading the present descriptions. In a further embodiment, at least the first material 208 may have a characteristic of being deposited through the EPD process above a non-planar electrode. For example, the non-planar electrode may have a cylindrical shape, a regular polygonal shape, a conical shape, a curved surface shape, or any other non-planar shape as would be understood by one of skill in the art upon reading the present descriptions. Non-planar electrodes are described in more detail later.

In another embodiment, the second material 204 may have a characteristic of being deposited through an EPD process, and may further have a characteristic of being deposited above a non-planar electrode, as described later. Moreover, this may include characteristics of the second material being deposited after the first material is deposited.

In one embodiment, a gradient of some layers of the plurality of layers 202 may be defined by the first material 208 being arranged in a third pattern and the second material 204 being arranged in a fourth pattern, wherein the third pattern is complementary to the fourth pattern. Of course, the patterns shown in FIGS. 2A and 2B are not limiting on the invention in any way, and any patterns may be used as would be understood by one of skill in the art upon reading the present descriptions. In some approaches, the first, second, third, and/or fourth patterns may overlay one another and/or be coexistent therewith.

In another embodiment, at least the first material 208, the second material 204 and/or some layers of the plurality of layers 202 may have a characteristic of being deposited through an EPD process according to the third pattern. In a further embodiment, at least the first material 208, the second material 204 and/or some layers of the plurality of layers 202 may have a characteristic of being deposited through the EPD process above a non-planar electrode, as described previously.

In another embodiment, the first pattern may be different from the third pattern, e.g., each layer may use one or more unique pattern and/or materials, thereby creating a structure which, in the z-direction perpendicular to the x-y plane, may have differing arrangements of materials. Of course, in another embodiment, the second pattern may be different from the fourth pattern.

According to another embodiment, as shown in FIG. 2B, a gradient 210 may exist in a z-direction perpendicular to the x-y plane of the plurality of layers 202, the gradient being a transition from at least one of: a first composition, a first microstructure, and a first density of the plurality of layers 202 to at least one of: a second composition, a second microstructure, and a second density of the plurality of layers 202, wherein at least one of: the first composition and the second composition are different, the first microstructure and the second microstructure are different, and the first density and the second density are different. This gradient in the z-direction may be used in addition to or in place of a gradient in the x-y plane of each layer based on patterns, e.g., the ceramic, metal, or cermet 200 may be formed by changing solutions in an EPD chamber during EPD processing, in one approach.

According to one proposed use, a high-powered laser may comprise the ceramic 200 as a transparent ceramic optic in the laser.

As would be understood by one of skill in the art upon reading the present descriptions, one or more additional layers may be arranged above the plurality of layers 202, thereby forming a structure that may have complex layering and/or composition, with gradients possible in the x-y plane and the z-direction across all the layers.

In one embodiment, EPD may be used in conjunction with controlled electric field patterns to direct the composition of deposited material in an x-y plane parallel to a plane of deposition, including multilayer deposition of a single pattern as well as dynamically changing patterns as the particles build up in the z-dimension, perpendicular to the x-y plane. This technique enables, for example, transparent ceramic optics with a controlled, smooth, x-y concentration of dopant material.

Current optics designs are material and process limited to uniform composition profiles across optical components and laser gain media. To date, only coarse step function composition changes have been produced in the most advanced transparent ceramic optics. However, in one embodiment, because the electrophoretic deposition occurs only where the field is applied, precisely patterned x-y concentration profiles are possible by modifying the electrode pattern in this plane. To enable this capability, one electrode in a typical EPD system may be replaced with a photoconductive layer (such as α-H:Si) and a transparent or semi-transparent electrode, e.g., of indium tin oxide (ITO) and illuminated in specific regions using any number of light sources and/or light altering devices or mechanisms, such as a static mask, a dynamic pattern from a light altering or emitting mechanism, etc.

Figure 3A:
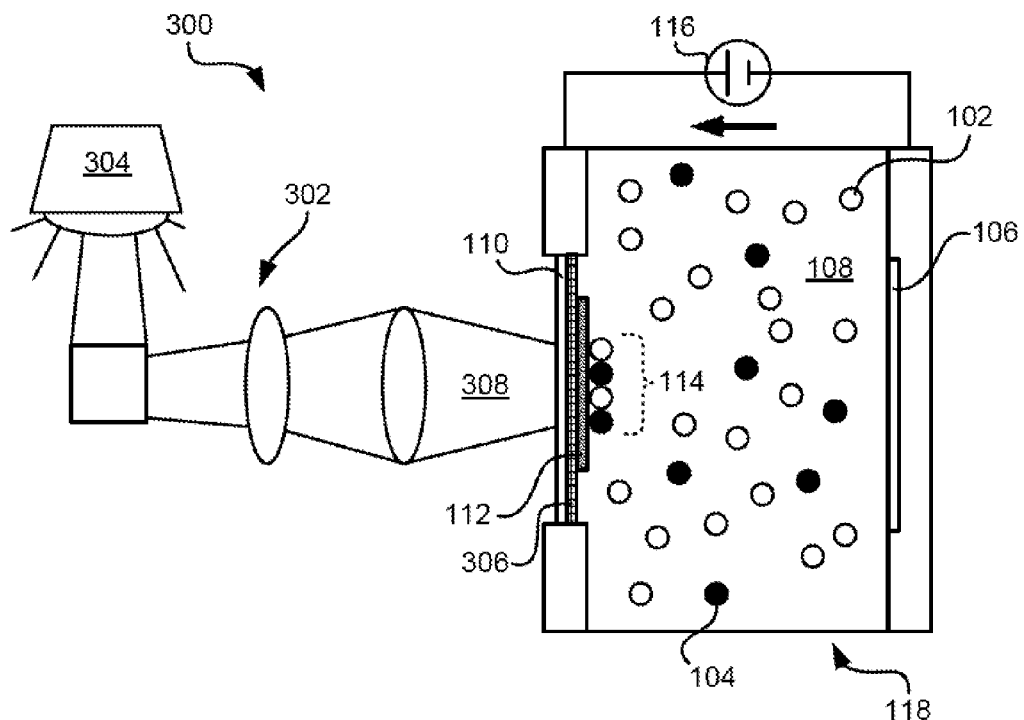
FIG. 3A is a simplified schematic diagram of an EPD device, according to one embodiment.

With reference to FIGS. 3A, an EPD device 300 is shown according to one embodiment. The EPD device 300 comprises a first electrode 110 and a second electrode 106 positioned on either side of an EPD chamber 118. A circuit is provided to apply a voltage difference 116 across the two electrodes 106, 110. The EPD chamber 118 includes a solution which may comprise a solvent 108 (either aqueous or organic), one or more materials 102 and/or 104 therein for deposition, and a gelling agent (either organic or aqueous, such as an organic sol). In some embodiments, a substrate 112 may be placed on a solution side of the first electrode 110 such that the materials 114 may collect thereon.

Referring to FIG. 3A, a light source 304 may be provided to provide light 308 to a photoconductive layer 306 that becomes conductive in response to areas where the light 308 is shined thereon. In this approach, the first electrode 110 may be transparent or semi-transparent, thereby allowing light 308 from the light source 304 to reach the photoconductive layer 306. In FIG. 3A, the substrate 112 does not extend to fully cover the photoconductive layer 306, but the invention is not so limited. In this or any other embodiment, the photoconductive layer 306 may be applied to the substrate 112, to the first electrode 110, may be a separate component in the device 300, may be shaped differently or the same as any other component to which it is applied, etc.

As shown in FIG. 3A, the light 308 from the light source 304, in one embodiment, passes through a light altering mechanism 302, which may include one or more lenses or optical devices, one or more mirrors, one or more filters, one or more screens, or any other light altering mechanism as would be known to one of skill in the art that would be capable of providing one or more patterns to the light 308 (e.g., to alter the light 308 from the light source 304) prior to reaching the photoconductive layer 306, in various embodiments. In some embodiments, the light altering mechanism 302 may be capable of dynamically altering the light 308, according to user preferences, applications requirements, predefined patterns, spacings, durations, etc. According to some embodiments, light altering mechanism 302 may include a digital light processing (DLP) chip, laser scanning, light rastering, and/or a liquid crystal on silicon (LCoS) chip or array.

Figure 3B:
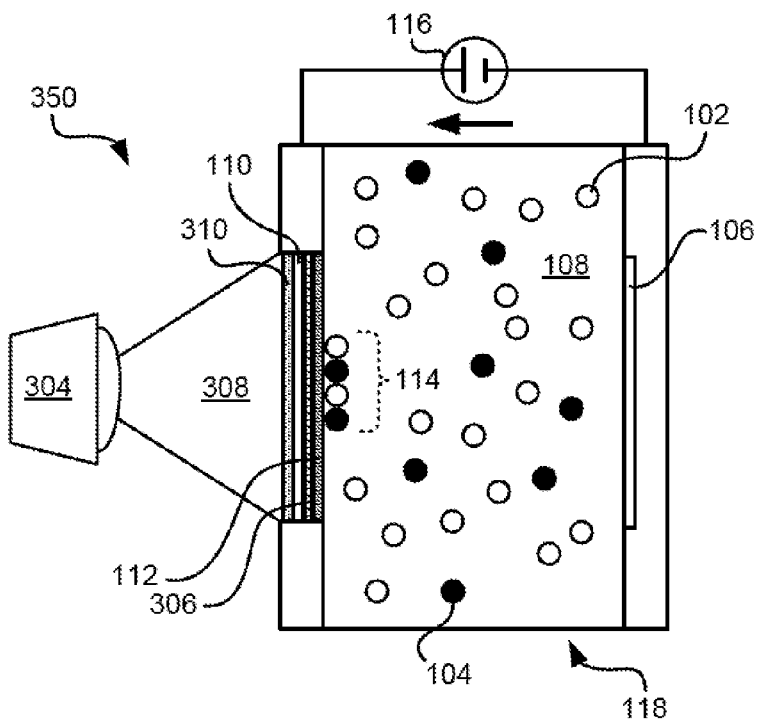
FIG. 3B is a simplified schematic diagram of an EPD device, according to one embodiment.

As shown in FIG. 3B, the EPD chamber 118 is essentially the same as in FIG. 3A, except that in FIG. 3B, the light altering mechanism 310 is positioned near to the photoconductive layer 306. Therefore, the light 308 from the light source 304, in one embodiment, passes through the light altering mechanism 310 prior to reaching the photoconductive layer 306, in one embodiment. According to several approaches, the light altering mechanism 310 may include a LCoS array, one or more filters, one or more patterned screens, or any other light altering mechanism as would be known to one of skill in the art that would be capable of providing one or more patterns to the light 308 (e.g., to alter the light 308 from the light source 304).

In these embodiments, dynamic altering of the light 308 is greatly enhanced, as the light altering mechanism may be programmed to change over time to allow light 308 to reach the photoconductive layer 306 as desired by a user.

The light source 304 may be any light source capable of providing sufficient light 308 to shine upon designated areas of the photoconductive layer 306, as would be understood by one of skill in the art upon reading the present descriptions.

Other components shown in FIGS. 3A-3B of the EPD devices 300, 350 not specifically described herein may be chosen, selected, and optimized according to any number of factors, such as size limitations, power requirements, formation time, etc., as would be known by one of skill in the art.

Figure 4:
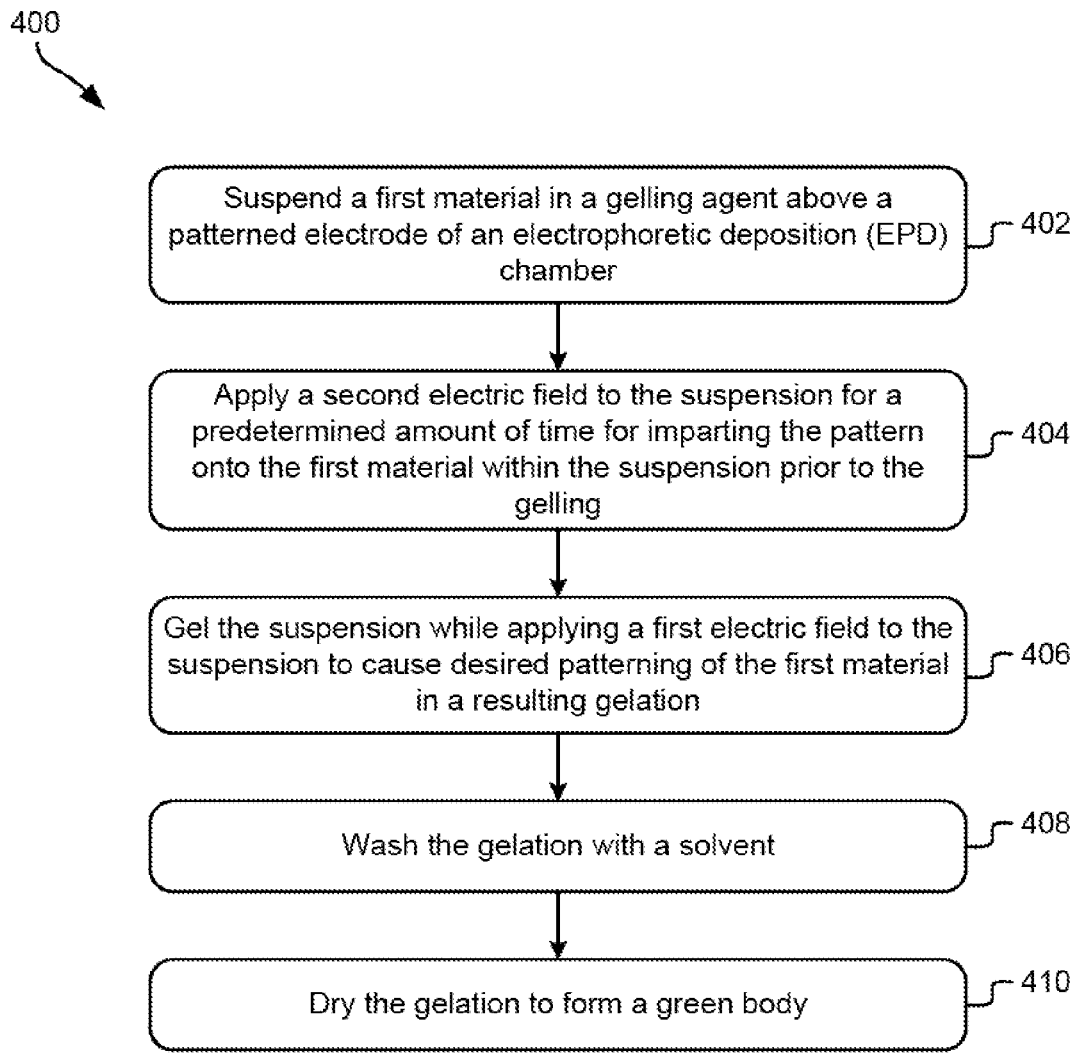
FIG. 4 is a flow diagram of a method for electrophoretic deposition of a three-dimensionally patterned green body, according to one embodiment.

Now referring to FIG. 4, a method 400 for electrophoretic deposition of a three-dimensionally patterned green body is shown according to one embodiment. The method 400 may be carried out in any desired environment, including those shown in FIGS. 1 and 3A-3B, those shown in U.S. patent application Ser. No. 13/085,405, and others.

In operation 402, a first material is suspended in a gelling agent above a patterned electrode of an EPD chamber. Any technique for suspending the first material may be used as known in the art, such as mixing, agitating, stirring, etc.

In optional operation 404, a second electric field may be applied to the suspension for a predetermined amount of time for imparting the pattern onto the first material within the suspension (prior to the gelling). In this way, the first material may be arranged as desired in within the gelling agent prior to gelling taking place, ensuring a desired pattern is imparted on the first material.

The amount of time that the second electric field is applied may be based upon an amount of time required for the first material to orient itself according to the second electric field. In one example, the second electric field may be applied for an amount of time in a range from about 3 minutes to about 15 minutes or more.

In operation 406, the suspension is gelled while applying a first electric field to the suspension to cause desired patterning of the first material in a resulting gelation. Any gelling technique may be used, such as heating, waiting, exposure to ultraviolet light, addition of catalyst or reactant, etc.

In one approach, the gelling agent may be an organic sol comprising water, resorcinol, formaldehyde, and sodium carbonate, or any other suitable components that may form a suitable organic sol, as known in the art.

According to another embodiment, the first electric field may be of lesser strength than the second electric field. In this way, only maintenance of the orientation of the first material is needed after they have arranged themselves during gelling.

In optional operation 408, the gelation may be washed with a solvent.

In optional operation 410, the gelation may be dried to form a green body.

According to one embodiment, the solvent may be acetone or some other suitable solvent, and the drying may occur supercritically. This method 400 ensures that the patterning occurs three-dimensionally throughout the green body.

According to another embodiment, field-aligned EPD may be used to align nano-rod and/or micron-scale rod particles (non-spherical particles having a longitudinal length greater than a width) of a non-cubic material as they are deposited to form a green structure. In general, the longitudinal axes of the particles become aligned with each other in the electric field extending across the EPD chamber. See, e.g., FIG. 5B, discussed below. This technique can produce transparent ceramics composed of a non-cubic material. Laser physicists and optical system engineers are currently hindered by the small subset of materials available for their designs. The only crystalline materials available to them are those that can be grown as single crystals and isotropic cubic materials that can be formed into transparent ceramics. By depositing nano-rods and/or micron-scale rods of a non-cubic material in the same orientation, the resulting green-body may be sintered to a transparent ceramic.

This approach may use very strong magnetic fields (on the order of 10 Tesla) to align particles. Micro- and nano-rod and/or micron-scale rod particles align with their longitudinal axes parallel to an applied electric field (and thus, substantially parallel to each other) due to dielectrophoretic and induced charge electrophoretic motion. Since electric dipoles are more readily induced in ceramic materials than magnetic dipoles, this method is more effective using EPD. In the EPD system, the nano-rods and/or micron-scale rods align in the electric field in suspension and retain their alignment as they are deposited on the surface.

Figure 5B:
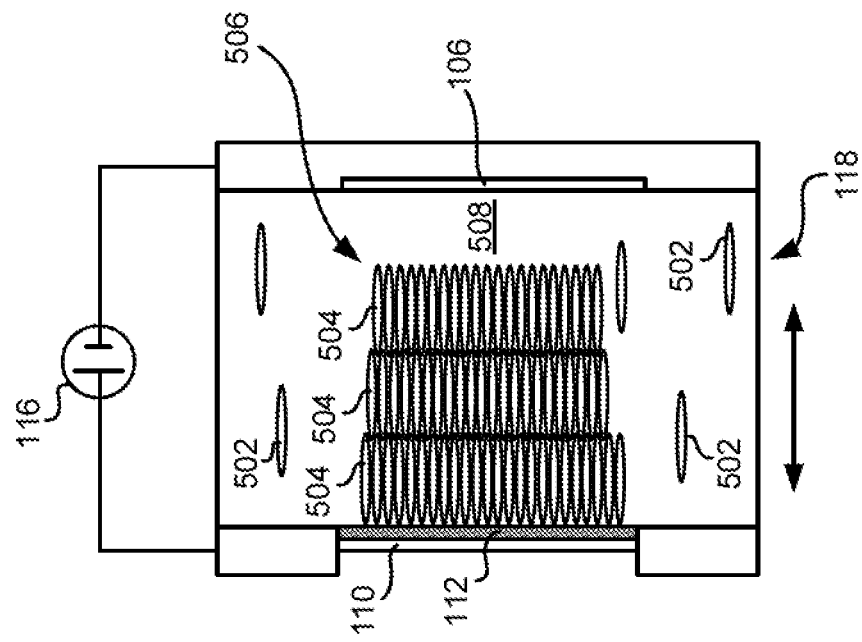
FIGS. 5A-5B show the formation of a ceramic through EPD, according to one embodiment.
Figure 5A:
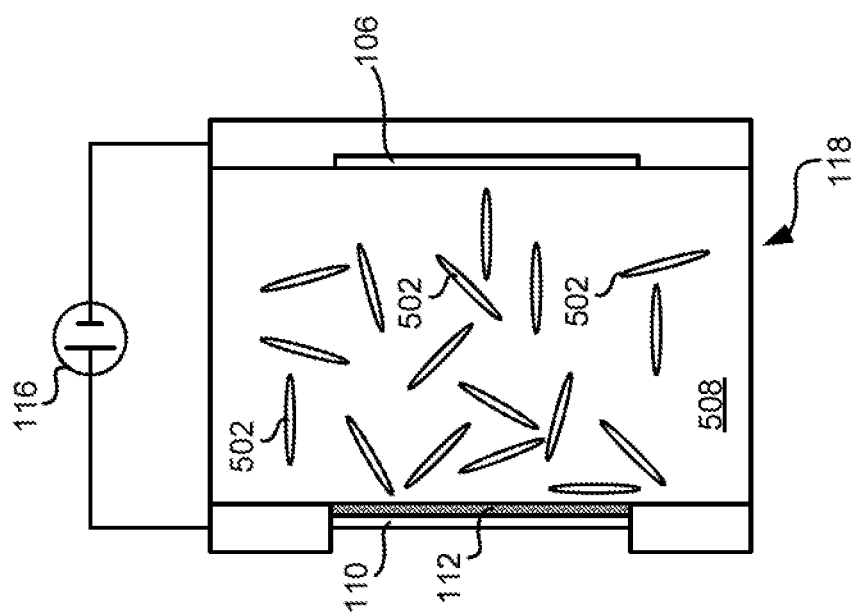

Now referring to FIGS. 5A-5B, a ceramic 506, particularly a transparent ceramic, and a method of forming the ceramic 506 are shown according to various embodiments. FIG. 5A shows a condition when an electric field is not activated, and FIG. 5B shows a condition when the electric field is activated for a time.

Referring again to FIGS. 5A-5B, in one embodiment, the ceramic 506 comprises a plurality of layers 504 comprising particles 502 of a non-cubic material (e.g., the particles have a non-spherical shape, a non-cubic shape, etc., and do not readily form into crystal lattices). Each layer 504 is characterized by the particles 502 of the non-cubic material being aligned in a common direction, as indicated by the arrow in FIG. 5B when the electric field 116 is activated. According to a preferred embodiment, after sintering, curing, or any other process to create a ceramic or composite from the green structure shown in FIG. 5B, the ceramic may be transparent, which is difficult to achieve from non-cubic starting materials.

According to one embodiment, the plurality of layers 504 may have a characteristic of being deposited through an EPD process, as described previously. In a further embodiment, the plurality of layers 504 may have a characteristic of being deposited through the EPD process above a non-planar electrode, as will be described later in more detail.

In one approach, the starting materials, e.g., the non-cubic material comprises a plurality of particles 502, e.g., nano-rod and/or micron-scale rod particles having a longitudinal length that is at least three times longer than a width thereof, as shown in FIGS. 5A-5B.

In one preferred use, a high-powered laser may comprise the ceramic 506 (after sintering, curing, etc., thereof) as a transparent ceramic optic in the laser.

In another embodiment, non-spherical particles may be aligned within an electrophoretic field using the direct current (DC) electrophoretic field and/or an alternating current (AC) electric field applied perpendicular to a plane of deposition. In this approach, upon deposition, the non-spherical particles may form a structure with highly aligned grains. In some embodiments, highly aligned grains orientation may reduce differential indices of refraction between grains, thus rendering useful optical properties to the aligned structures.

For example, a method for forming a ceramic, particularly a transparent ceramic, from non-cubic starting material is described that may be carried out in any desired environment, including those shown in FIGS. 1 and 3A-3B, among others.

In one embodiment, a plurality of layers 504 of particles 502 of a non-cubic material are electrophoretically deposited as described previously. The particles 502 of the deposited non-cubic material are oriented in a common direction, as indicated by the arrow. The deposition of these particles 502 may be supported by the presence of a gelling agent 508, which after gelation, provides support for the structure. The common direction may be related to a longitudinal direction of the particles 502; e.g., length of a cylinder, length of a rectangular polygon, etc.

The method may further comprise applying an alternating current (AC) electric field in a direction parallel to a plane of deposition of the plurality of layers, which is also parallel to a direction of a DC field applied during EPD, according to one embodiment.

In another embodiment, the method may further comprise sintering the plurality of layers of non-cubic material 506 to form a ceramic, wherein the non-cubic material is selected such that the ceramic is transparent.

In one approach, the plurality of layers may be deposited above a non-planar electrode, as discussed in detail later.

In one embodiment, non-cubic crystalline materials, such as hydroxyapatite, chloroapatite, alumina, etc., may be formed into crystal structures exhibiting optical properties of highly cubic structures. In this approach, non-spherical particles may be aligned and deposited in a crystal structure and possibly mixed with dopants during deposition so as to generate a smooth gradient of crystalline material with precisely known optical characteristics.

One advantage of the above described AC-EP alignment- and DC-EPD method is a significant reduction in production time for highly aligned optical crystals, whereas conventional single crystal growing methods may take several days to months to produce an aligned crystal of sufficient size for desired application, the same size and quality crystal may be generated in a matter of hours by utilizing EP alignment and deposition.

In one approach, a conductive base material such as a metal electrode may serve as a substrate for plating subsequent layers of material in complex structures defined by pattern-oriented deposition.

In another approach, a metal electrode may be replaced by a transparent or semi-transparent electrode with an attached photoconductive layer capable of being illuminated in specified regions using either a static mask or dynamic pattern from a dynamic light processing (DLP) chip, liquid crystal on silicon (LCoS), or other similar device as known in the art.

In yet another approach, a nonconductive substrate may be coated with a thin film of conductive material, such as gold, nickel, platinum, etc., as known in the art, in order to confer conductivity on the substrate and allow non-planar deposition thereupon. In this manner, virtually any substrate may be subjected to specialized modification and coating using the EPD methodology.

In another embodiment, EPD may be used with automated particle injection to control z-axis deposition and composition of a suspension solution. This technique enables production of multicomposition materials, such as opaque ceramic armor prototypes with a gradient in the properties in the z-direction from a hard strike face (boron carbide) to ductile backing (aluminum).

To control the composition of the green-body in the z-axis, the composition of the suspension may be adjusted in the EPD chamber using an automated injection system, according to one embodiment. Using this technique, a sharp gradient may be formed by abruptly changing the particle solution or a smooth gradient by gradually adjusting between two particle types. Of course, more than two particle types may be used in any embodiment, and gradients between two, three, four, or greater materials may be formed using techniques described herein.

For the armor application, particles of a hard material such as $AlMgB_{14}$, $TiB_2$, SiC, boron carbide, etc. particles may be electrophoretically deposited to create a hard surface, then the solution may gradually be transitioned to include an increasing amount of relatively lighter metals or alloys such as particles of aluminum, Al—Mg, Al—Mg—Li, etc. to create a ductile backing. This transition from hard to ductile material is predicted to be an ideal composition for an efficient armor plate, as opposed to a sharp gradient.

Figure 6:
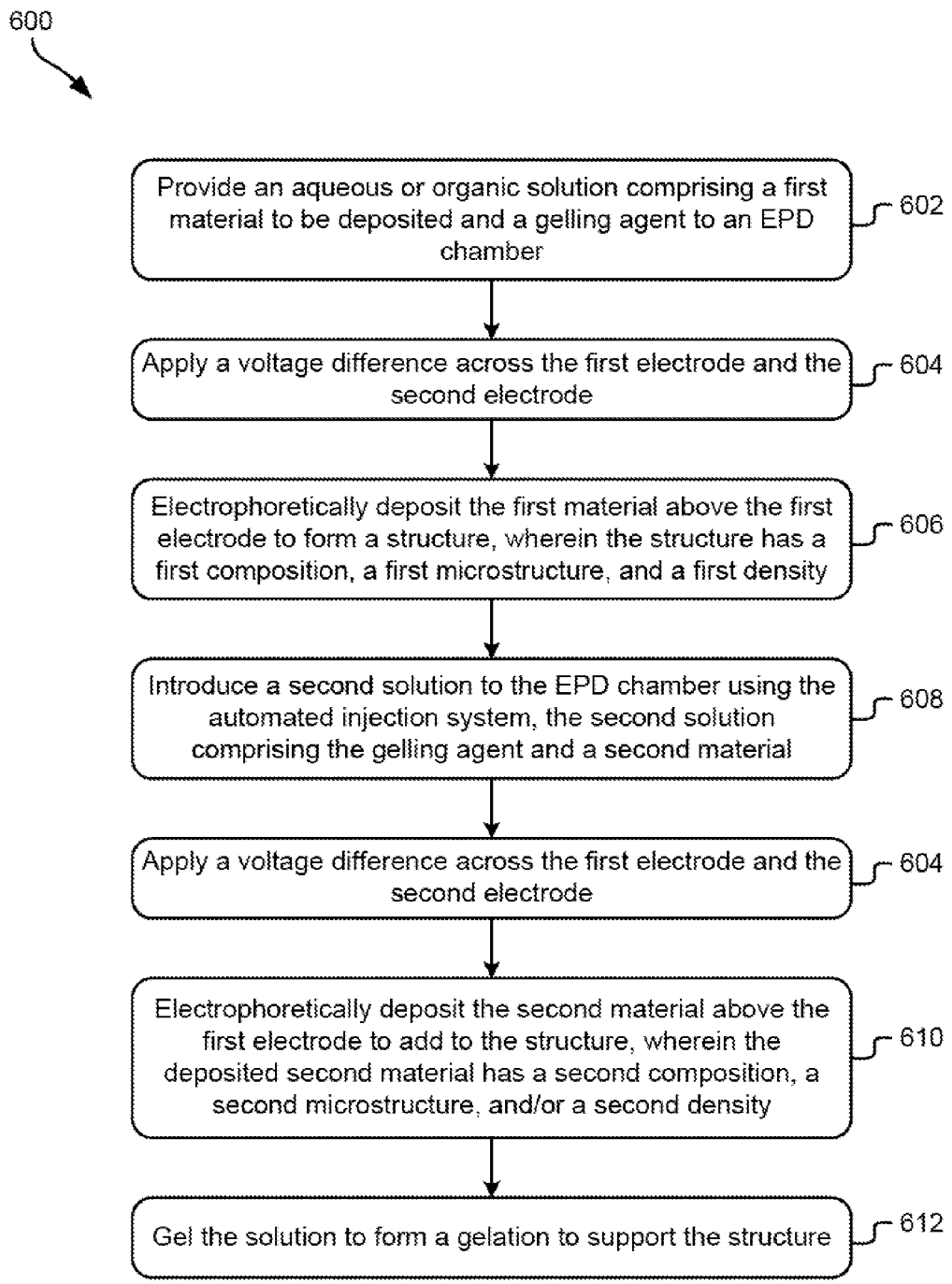
FIG. 6 is a flow diagram of a method for forming a green body, according to one embodiment.

Now referring to FIG. 6, a method 600 for forming a green body is shown according to one embodiment. The method 600 may be carried out in any desired environment, including those shown in FIGS. 1 and 3A-3B, U.S. patent application Ser. No. 13/085,405, and others.

In operation 602, an aqueous or organic solution comprising a first material to be deposited and a gelling agent is provided to an EPD chamber.

In operation 604, a voltage difference is applied across the first electrode and the second electrode.

In operation 606, the first material is electrophoretically deposited above the first electrode to form a structure, wherein the structure has a first composition, a first microstructure, and a first density.

In optional operation 608, a second solution is introduced to the EPD chamber using an automated injection system, the second solution comprising the gelling agent and a second material.

In repeated operation 604, a voltage difference may be applied across the first electrode and the second electrode.

In optional operation 610, the second material is electrophoretically deposited above the first electrode (and possibly the first material) to add to the structure, wherein the deposited second material has a second composition, a second microstructure, and/or a second density.

In this way, the first and second patterns direct deposition of the first and second materials to form a gradient in composition, microstructure and/or density in an x-y plane oriented parallel to a plane of deposition of the structure.

In operation 612, the solution is gelled to form a gelation to support the structure.

In some approaches, the first pattern and/or the second pattern may be dynamically altered to modify a gradient in composition, microstructure and/or density in a z-direction across a plurality of layers of the structure, wherein the z-direction is perpendicular to the x-y plane of the structure, and wherein the gelation supports the structure during deposition thereof.

In another approach, the first pattern and the second pattern may be complementary to each other.

Additionally, in some approaches, the aqueous or organic solution comprising the first material may be expelled from the EPD chamber prior to introducing the aqueous or organic solution comprising the second material into the EPD chamber.

The method 600 may also comprise washing the structure with a solvent and drying the structure to form a green body. In some approaches, the solvent may be acetone and the drying may be performed supercritically.

In another approach, the first electrode may have a non-planar shape.

At least one of: the first and second composition are different, the first and second microstructure are different, and the first and second density are different, thereby defining different layers of the green body, in some approaches.

According to some embodiments, optional operations may be performed in addition to those in method 600. For example, in one approach, light in a first pattern may be provided to a photoconductive layer positioned near the first electrode, wherein the first electrode is transparent or semi-transparent and the photoconductive layer is positioned between the first electrode and the second electrode. Portions of the photoconductive layer become conductive in response to the light according to the first pattern, and the first material is electrophoretically deposited above the photoconductive layer according to the first pattern.

In another embodiment, light in a second pattern may be provided to the photoconductive layer after introducing the second solution to the EPD chamber, wherein portions of the photoconductive layer become conductive in response to the light according to the second pattern, the second material is electrophoretically deposited above the photoconductive layer according to the second pattern, and the first and second patterns direct deposition of the first and second materials to form a gradient in composition, microstructure and/or density in an x-y plane oriented parallel to a plane of the photoconductive layer, e.g., a plane positioned perpendicular to a direction of movement of the particles caused by the voltage difference.

According to one embodiment, the first pattern and/or second pattern may be dynamically altered to modify a gradient in composition, microstructure and/or density in a z-direction across a plurality of layers, wherein the z-direction is perpendicular to the x-y plane.

In another embodiment, the first electrode may have a non-planar shape.

In several embodiments, the first and second composition may be the same, the first and second microstructure may be the same, and/or the first and second density may be the same; however, as previously described, each may be different in other embodiments.

According to one approach, the first material may comprise boron carbide and the second material may comprise aluminum, or some other combination of rigid and flexible materials as would be understood by one of skill in the art.

In another embodiment, as referenced throughout, EPD with shaped graphite or machined metal electrodes with non-planar geometries may be used to create green-bodies with complex shapes. This technique can be combined with any of the previously described techniques to simultaneously achieve a defined nano- or microstructure. Potential applications include opaque ceramic armor prototypes with a radius of curvature greater than about 2 inches made from a single precursor material. Using graphite as an electrode material, complex electrode geometries may be created which provide a contour for the bulk part during deposition. Using finite element modeling as a guide, the electrode shapes and the resulting electric fields may be controlled such that they are conducive to rapid and dense deposition of material.

In one exemplary embodiment used to illustrate the ability to form three-dimensional structures using EPD, polystyrene particles suspended in an organic sol were deposited, using EPD, onto a patterned electrode. The pattern was extended in the z-axis by more than about 20 µm and stabilized via gelation of the organic sol, which is unique to this process.

Figure 7A:
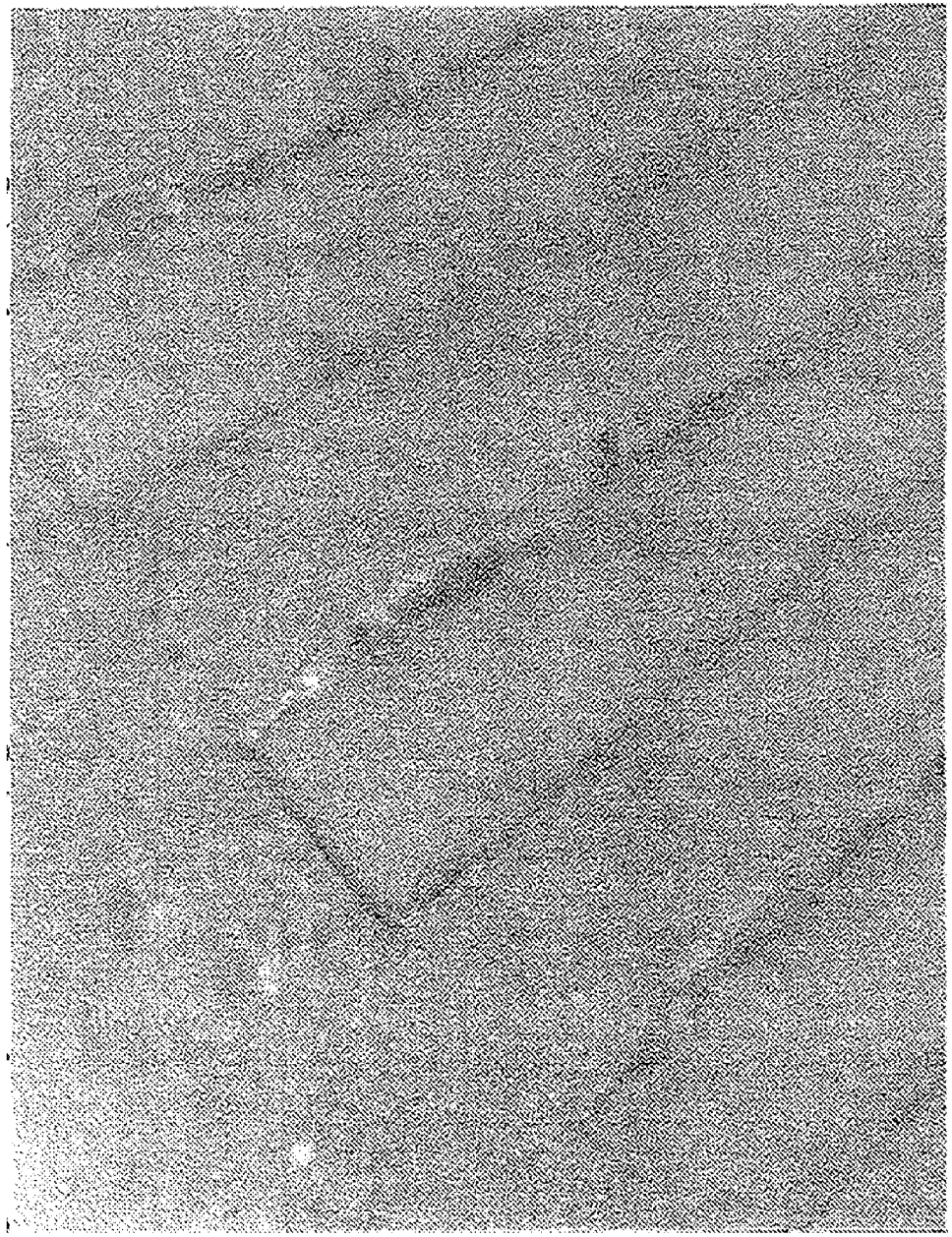
FIGS. 7A-7C show images of green bodies formed through EPD, according to various exemplary embodiments.
Figure 7B:
Figure 7C:
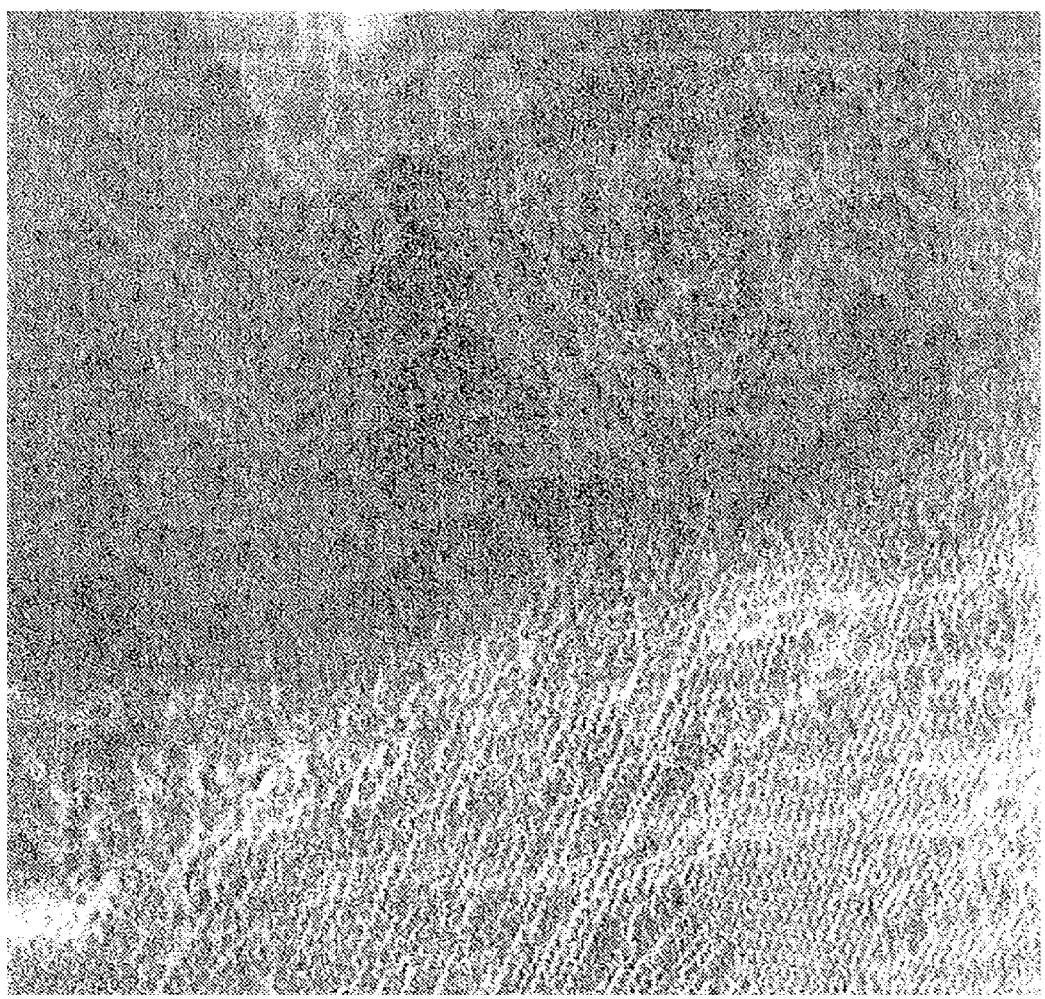

In this exemplary embodiment, which is not meant to be limiting in any manner but instead is intended to help illustrate one possible formation process, a mixture was formed by combining 7.1 g water, 0.625 g resorcinol, 0.9 g formaldehyde, and 3 mg sodium carbonate. Then, 1 ml of 10 vol % 220 nm polystyrene particles with carboxylated surface functionalization was added to the mixture to form a suspension. An electric field of 10 V/cm was applied to the suspension for 3 minutes. This suspension was held in an EPD assembly, which was then sealed and held at an elevated temperature overnight to allow gelling while maintaining an electric field of 1 V/cm. After gelation, the sample was washed in acetone and supercritically dried, thereby producing a dry green body. Upon separation of the green body from the patterned substrate, the transfer of the pattern from the electrode to the green body was evident, as shown in FIGS. 7A-7C. Scanning electron microscopy (SEM) analysis confirmed that the pattern transferred from the substrate to the green body and it also confirmed a depth of the transfer.

FIG. 7A shows an optical image of a pattern transferred to a green body, with ordered close-packing of polystyrene particles evident. FIG. 7B shows an SEM image of a patterned green body, and FIG. 7C shows an SEM image of an interface between patterned and unpatterned regions of the green body. The ordered packing of the particles in the lower portion of the SEM image in FIG. 7C is the patterned region, while the upper portion is unpatterned.

In another exemplary embodiment which is used to illustrate the ability to create transparent ceramics, an organic gel was used to stabilize a ceramic green body of 20 vol % density. The green body was then sintered until transparency was achieved.

Figure 8:
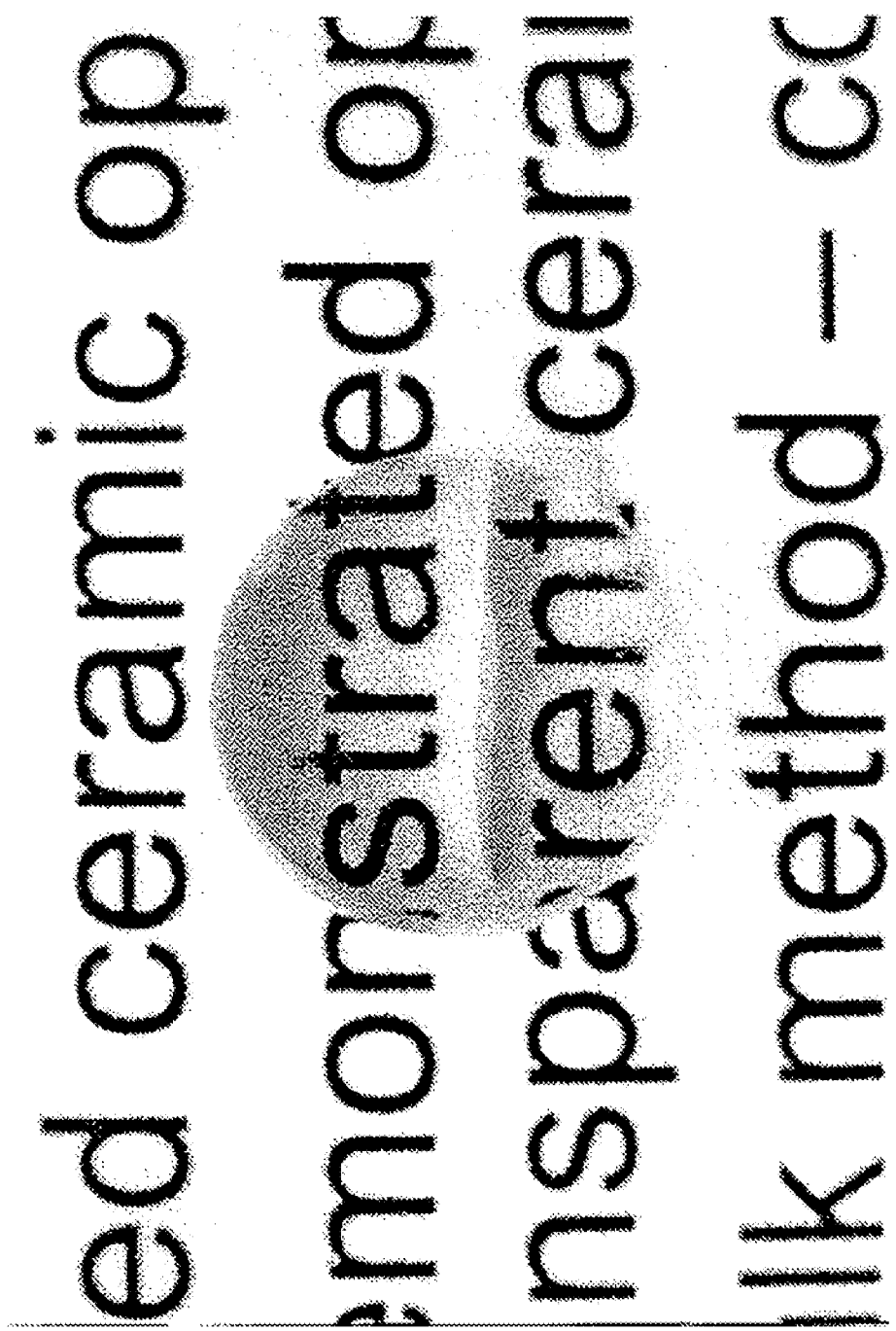
FIG. 8 shows an optical image of a transparent ceramic produced from a 20% dense green body stabilized with a sacrificial organic aerogel in front of text in order to illustrate the transparent property of the ceramic.

In this exemplary embodiment, which is not meant to be limiting in any manner but instead is intended to help illustrate one possible formation process, a 20 vol % suspension of neodymium-doped gadolinium yttrium scandium aluminum garnet (Nd:YSAG) nanoparticles in 8 ml water was prepared with an appropriate amount of surfactant. The amount of surfactant would be known to one of skill in the art upon reading the present descriptions. Then, 0.625 g resorcinol and 0.9 g formaldehyde was added to the suspension. The suspension was allowed to gel at elevated temperatures, as known in the art. After gelation, the sample was washed in acetone and dried in supercritical $CO_2$, thereby yielding the green body. The green body was then sintered to yield a transparent structure. FIG. 8 shows an optical image of a transparent ceramic produced from a 20% dense green body stabilized with a sacrificial organic aerogel in front of text in order to illustrate the transparent property of the ceramic.

The methods and structures disclosed herein, according to various embodiments, dramatically expand the design space for many applications and may immediately impact high average power laser design. Creating composition gradients and complex geometries for ceramic armor enables optimal armor performance and provides the capability to develop new state-of-the-art designs. Producing transparent ceramics from non-cubic materials allows for a paradigm shift in the field of optical materials by creating a completely new family of transparent optics. In addition, super-lattice substrates for radiation detection may also be created, in some approaches.

Transparent ceramic optics and ceramic armor plates are two areas where the methods and structures disclosed herein may have the most impact. Laser physicists and optical system engineers are currently hindered by the small subset of materials available for their designs. The only crystalline materials open to these fields are those that are capable of being grown as single crystals and isotropic cubic materials that are capable of being formed into transparent ceramics. Additionally, current optics designs are material and process limited to uniform composition profiles across optical components and laser gain media. To date, only coarse step function composition changes have been produced in the most advanced transparent ceramic optics. For armor applications the ideal ceramic plates should match the anatomical profile of the soldier wearing it. Furthermore, the armor should have a hard surface to withstand piercing and a ductile backing to avoid cracking after impact. Current fabrication techniques, including cold pressing and slip casting, do not provide adequate control of the green body thickness or graded composition and significantly limit the complexity of the armor shape to only simple designs.

According to various embodiments, the methods and structures disclosed herein are capable of creating transparent ceramic optics with doping profiles tailored in three-dimensions to enable new high-powered laser designs, depositing aligned nanoparticles of non-cubic ceramics to create a new family of transparent ceramics, and creating ceramic armor plates with complex geometries and controlled material composition for both high ductility and hardness.

As the embodiments described herein aptly demonstrate, the EPD methods and structures formed through the EPD methods disclosed herein, according to various embodiments, may be used for any number of novel materials and structures. According to some embodiments, the structures and methods may be used for applications including hydrogen storage for fuel cells, targets for lasers, capacitors, batteries, optics, biological detectors, and armor, among many other uses. Some specific uses include fabricating transparent ceramic optics with doping profiles tailored in three-dimensions to enable new high-powered laser designs, depositing aligned particles of non-cubic ceramics to create a new family of transparent ceramics, and creating ceramic or cermet armor plates with complex geometries and controlled material composition for lightweight and highly effective armor designs.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A product, comprising:
a plurality of layers, each of the plurality of layers comprising non-spherical particles,
wherein each layer comprises a gradient in composition, microstructure, and/or density of the non-spherical particles in an x-y plane oriented parallel to a plane of deposition of the plurality of layers along a predetermined distance in a z-direction perpendicular to the plane of deposition, wherein each of the non-spherical particles has a longitudinal axis, the longitudinal axes of the non-spherical particles being oriented in a single common direction.

2. The product as recited in claim 1, wherein the gradient in at least one of the layers is defined by a first plurality of non-spherical particles being arranged in a first pattern and a second material plurality of non-spherical particles being arranged in a second pattern, wherein the first pattern is complementary to the second pattern.

3. The product as recited in claim 2, wherein the first-plurality of non-spherical particles and the second plurality of non-spherical particles have a characteristic of being deposited through an electrophoretic deposition (EPD) process utilizing at least one patterned electrode, the patterned electrode being configured to facilitate deposition of the first plurality of non-spherical particles according to the first pattern and the second plurality of non-spherical particles according to the second pattern.

4. The product as recited in claim 2, wherein at least one other layer comprises a gradient defined by a third plurality of non-spherical particles being arranged in a third pattern and a fourth plurality of non-spherical particles being arranged in a fourth pattern, wherein the third pattern is complementary to the fourth pattern, wherein the first pattern is different from the third pattern.

5. The product as recited in claim 2, wherein the first plurality of non-spherical particles is comprised of a first non-cubic crystalline material, and the second plurality of non-spherical particles is comprised of a second non-cubic crystalline material, the first non-cubic crystalline material being different than the second non-cubic crystalline material.

6. The product as recited in claim 1, wherein the non-spherical particles each have a longitudinal length that is at least three times longer than a width thereof.

7. A high-powered laser comprising the product as recited in claim 1 as a ceramic optic in the laser.

8. The product as recited in claim 1, wherein the product is transparent.

9. The product as recited in claim 1, wherein the non-spherical particles comprise fluorapatite.

10. The product as recited in claim 1, wherein the fluorapatite particles each have a diameter of about 100 nm and a length of about 500 nm.

* * * * *